United States Patent
Parisel et al.

(10) Patent No.: US 9,174,193 B2
(45) Date of Patent: Nov. 3, 2015

(54) POLYMERISATION REACTOR

(75) Inventors: Marc Parisel, Vilvoorde (BE); Brent Walworth, Sint-Niklaas (BE)

(73) Assignee: INEOS MANUFACTURING BELGIUM, Antwerpen (BE)

( * ) Notice: Subject to any disclaimer, the term of this patent is extended or adjusted under 35 U.S.C. 154(b) by 948 days.

(21) Appl. No.: 12/735,349

(22) PCT Filed: Feb. 4, 2009

(86) PCT No.: PCT/EP2009/051248
§ 371 (c)(1), (2), (4) Date: Sep. 20, 2010

(87) PCT Pub. No.: WO2009/101007
PCT Pub. Date: Aug. 20, 2009

(65) Prior Publication Data
US 2011/0002816 A1    Jan. 6, 2011

(30) Foreign Application Priority Data

Feb. 12, 2008 (EP) ..................................... 08101527

(51) Int. Cl.
| | | |
|---|---|---|
| *B01J 19/24* | (2006.01) | |
| *B01J 19/00* | (2006.01) | |
| *B01J 3/04* | (2006.01) | |
| *B01J 8/00* | (2006.01) | |
| *C08F 2/00* | (2006.01) | |
| *C08F 2/01* | (2006.01) | |
| *F16L 9/00* | (2006.01) | |
| *F16L 9/18* | (2006.01) | |

(52) U.S. Cl.
CPC .............. *B01J 19/2435* (2013.01); *B01J 3/044* (2013.01); *B01J 19/0013* (2013.01); *B01J 2219/00094* (2013.01); *B01J 2219/00243* (2013.01)

(58) Field of Classification Search
CPC .............. B01J 8/00; B01J 19/00; B01J 19/24; B01J 19/2415; B01J 19/2435; B01J 19/18; B01J 19/1812; B01J 19/1837; B01J 2219/00; B01J 2219/00049; B01J 2219/00051; B01J 2219/00074; B01J 2219/00087; B01J 2219/00094; C08F 2/00; C08F 2/01; F16L 9/00; F16L 9/005; F16L 9/18
USPC .................... 422/129, 131, 132, 138; 438/64; 138/111–114; 526/64
See application file for complete search history.

(56) References Cited

U.S. PATENT DOCUMENTS 5,565,175 A    10/1996 Hottovy et al.
2005/0091021 A1*  4/2005 Gupta et al. .................... 703/12

FOREIGN PATENT DOCUMENTS

| EP | 0 659 475 A1 | 6/1995 |
|---|---|---|
| GB | 871752 A | 6/1961 |
| GB | 1 218 823 A | 1/1971 |
| WO | WO 01/78890 A2 | 10/2001 |
| WO | WO 2008/043472 A1 | 4/2008 |

OTHER PUBLICATIONS

Bernard, Marc. "The Paradox of Pressure Vessel Wall Thickness Calculation." Physica 139 & 140B (1986) pp. 773-775.*
Lambert, J.M., et al; "High-Pressure Reactor Design"; *Encyclopedia of Chemical Processing*; Taylor & Francis, Editor: Sunggyo Lee; vol. 1; pp. 1245-1248, p. 1252 (XP002526808). Dec. 12, 2007.

* cited by examiner

*Primary Examiner* — Natasha Young
(74) *Attorney, Agent, or Firm* — Nixon & Vanderhye P.C.

(57) ABSTRACT

Tubular reactor for use in polymerization reactions having a design pressure $P_R$ of 40-65 barg. The reactor includes a tube with a wall, and at least a portion of the tube is oriented vertically, with at least part of the vertical portion being surrounded by a concentric jacket for the passage of cooling fluid. The design pressure in barg of the jacket $P_J$ is less than $0.0018 \cdot P_R^{2.25}$.

9 Claims, No Drawings

POLYMERISATION REACTOR

This application is the U.S. national phase of International Application No. PCT/EP2009/051248 filed 4 Feb. 2009 which designated the U.S. and claims priority to European Patent Application No. 08101527.3 filed 12 Feb. 2008, the entire contents of each of which are hereby incorporated by reference.

The present invention relates generally to polymerisation reactors, and more specifically to loop reactors and a means of improving the efficiency of heat removal from such reactors.

Many polymerisation reactor systems employ loop reactors, which are of a continuous tubular construction comprising at least two, for example four, vertical sections and at least two, for example four horizontal sections. The volume of each loop reactor of a multiple reactor system can vary but is typically in the range 10-200 m$^3$, more typically 50-120 m$^3$. The reaction mixture passing through the loop reactor is typically in the form of a slurry.

Polymerisation reactions are usually exothermic, and the heat of polymerisation is typically removed from the reactors using indirect exchange with a cooling medium, preferably water, in jackets concentrically surrounding at least part of the tubular loop reactor. The efficiency of this heat removal is a key feature in operation of a polymerisation reactor. A restriction on the maximum cooling which can be achieved can limit the production rate, or can require reactors of greater surface area in order to achieve the desired level of heat removal.

A small proportion of the cooling required can be provided directly to the reaction mixture by the diluent and reactant feeds entering the reaction zone, which are at a lower temperature than the reaction temperature. However the main cooling is provided by exchanging heat at the outer surface of the reactor which is enclosed by the jacket containing the cooling fluid. The amount of heat which can be transferred from the reaction mixture to the cooling fluid in the jacket is proportional to the surface area, the overall heat transfer coefficient and the log mean temperature difference (LMTD).

The overall heat transfer coefficient, or its inverse thermal resistance, is essentially the sum of three parts: the heat transfer coefficient at the interface between reaction slurry and reactor internal wall, plus the heat transfer coefficient of the reactor wall itself, which is proportional to the wall thickness, plus the heat transfer coefficient at the interface between coolant fluid and reactor external wall. In addition to this, fouling at the wall on both slurry and coolant sides may also reduce the heat transfer coefficient. There is much prior art focusing on increasing heat transfer by reducing the thermal resistance of the reactor wall. The thermal resistance of the wall is the wall thickness divided by the thermal conductivity of the metal from which the wall is constructed. For example, U.S. Pat. No. 5,565,175 discloses a way of obtaining reduced wall thickness by using rolled plate and also a stronger material to construct the reactor and therefore permits lower thickness tolerances.

The factors which affect the thickness requirements for the wall are various, and depend not only on the internal reactor pressure and the materials of construction but also on the various stresses that are imposed by the geometry of the reactor and its support as well as the operating pressure of the cooling water circuit. Therefore there are limits to how much the wall thickness can be reduced, regardless of the tensile strength of the material used. The reactor wall must be designed to be able to withstand not only the pressure of the reaction mixture (or the difference between that and the pressure of the cooling fluid outside), but also the hydrostatic pressure of the fluid, particularly the cooling fluid when the reactor is not under pressure, since the reactor is oriented vertically. As is well known, a tubular wall can withstand significantly higher internal pressures than external pressures, and therefore it is often the maximum possible pressure in the jacket which is the limiting factor for thickness, even though the maximum pressure in the jacket is lower than that in the reactor itself. Even when a material having a very high tensile strength is used, there remains a risk of plastic deformation and/or elastic buckling due to this hydrostatic pressure caused by the head of fluid. In fact, thin-walled reactors made of very high tensile strength materials are at greater risk of this type of failure than thicker-walled reactors made of less strong materials.

Typically the loop reactor itself is designed to be able to withstand a range of pressures from near atmospheric pressure up to around 45-65 barg at the bottom of the reactor. This maximum pressure is governed by the operating conditions required to keep the mixture of hydrocarbons and light components such as hydrogen or ethylene in the liquid phase at any point in the reactor, so as to ensure stable reactor circulation pump operation, together with an additional margin to deal with pressure upsets.

The reactor cooling jacket is usually designed to be able to withstand a range of pressures from full vacuum up to about 8-16 barg. The maximum pressure is governed by the need to ensure that the jacket remains full of liquid during start-up, upset and shutdown conditions, as well as being able to handle cooling system malfunctions. Typically, the reactor cooling circuits have a very high flow rate, which means that in case of accidental closure of valves for example, the circuit may have to sustain the full shut-off head of the coolant circulation pump(s).

We have found that it is possible to reduce further the thickness of the reactor wall for a given wall material by designing the reactor cooling system so as to minimise the maximum pressure which the jacket must be designed to withstand ("design pressure"). As explained above, the design pressure of the jacket is intended to ensure that in all operating conditions, including possible malfunctions, the (vertical) jacket can be maintained full of coolant without risk of damage or failure. Design pressure is a fundamental characteristic of any piece of equipment designed to operate at pressure, and is therefore always marked on all relevant parts of the reactor system for safety reasons. It can be defined as the pressure at the most severe condition of coincident internal or external pressure and temperature expected during normal service.

The present invention is based on the appreciation that since a tube of a given thickness can withstand a higher internal pressure than external pressure, the external jacket design pressure can often be the limiting factor when determining the minimum required thickness of the reactor wall, rather than the (higher) internal reactor design pressure. Therefore if the jacket design pressure is lower, the maximum external pressure to which the reactor wall may be subjected at any time is lower, and hence the thickness of the wall can be reduced. Thus unlike in U.S. Pat. No. 5,565,175, in which a reduction in required wall thickness is accomplished by a different manufacturing method and materials for the reactor wall, the present invention can achieve reduction in required thickness without changing the reactor wall construction.

Accordingly in a first aspect the present invention provides a tubular reactor for use in polymerisation reactions having a design pressure $P_R$ of 40-65 barg, at least a portion of which is oriented vertically and at least part of which vertical portion is surrounded by a concentric jacket for the passage of cooling fluid, wherein the design pressure in barg of the jacket $P_J$ is less than $0.0018 \cdot P_R^{2.25}$.

By "oriented vertically" is meant that the relevant portion of the reactor has a longitudinal axis which is no more than 30 degrees from vertical, preferably no more than 10 degrees from vertical.

In an alternative aspect, the present invention provides a tubular reactor for use in polymerisation reactions having a design pressure $P_R$ of 40-65 barg, at least a portion of which is oriented vertically and at least part of which vertical portion is surrounded by a concentric jacket for the passage of cooling fluid, wherein the actual thickness of the reactor wall is either no more than 2 mm and/or no more than 10% greater than at least one of: the minimum wall thickness required to withstand the design pressure $P_R$ as calculated according to the ASME Boiler and Pressure Vessel code, and the wall design thickness t (mm) calculated according to the relationship $t = P_R \cdot R/(10S - 0.5 P_R) + C + tol$ where R is the internal radius of the reactor tube in mm, S is the design stress intensity at the design temperature in MPa, C is the sum of the inside and outside corrosion allowances for the reactor wall in mm, and tol is the manufacturing tolerance in mm.

The manufacturing tolerance is usually 12.5% of the thickness for an extruded pipe and zero for a cylinder made from plate (welded or seamed pipe).

The ASME Boiler and Pressure Vessel code is an internationally recognised code devised by the American Society of Mechanical Engineers, and includes a section (Section VIII) for use in the manufacture of pressure vessels. Section II covers material specifications. It establishes rules of safety governing the design, fabrication, maintenance and inspection of boilers and pressure vessels, and is well known to those skilled in the art. The minimum wall thickness required to withstand the design pressure $P_R$ as calculated according to the ASME code is intended to be the same as the design thickness t as defined by the relationship $t = P_R \cdot R/(10S - 0.5 P_R) + C + tol$. Both the ASME code and the design thickness are familiar to those skilled in the art, and are discussed for example in U.S. Pat. No. 5,565,175 mentioned above.

Whilst the ASME code and associated formulae allows calculations of theoretical minimum wall thicknesses required for both reactor design pressure $P_R$ and jacket design pressure $P_J$, the present invention is based on the appreciation that in practice, The most important parameter affecting the calculation of the minimum wall thickness for a given $P_R$ is the allowable (design) stress intensity S of the material at the design temperature. Stress intensity values for several materials at different design temperatures are published in tables in the ASME code. When the material is not in the table rules are given to calculate this stress value. These rules are different depending on whether the reactor is rolled plate or a seamless pipe.

In the first aspect of the invention, it is preferred that the actual thickness of the reactor wall is no more than 2 mm and/or no more than 10% greater than at least one of: the minimum wall thickness required to withstand the design pressure $P_R$ as calculated according to the ASME Boiler and Pressure Vessel code, and the wall design thickness t (mm) calculated according to the relationship $t = P_R \cdot R/(10S - 0.5 P_R) + C + tol$ where R is the internal radius of the reactor tube in mm, S is the design stress intensity at the design temperature in MPa, C is the sum of the inside and outside corrosion allowances for the reactor wall in mm, and tol is the manufacturing tolerance in mm.

In the second aspect of the invention, it is preferred that the design pressure of the jacket $P_J$ is less than $0.0018 \cdot P_R^{2.25}$.

In both aspects of the invention, it is preferred that the actual thickness of the reactor wall is either no more than 1 mm and/or no more than 5% greater than at least one of: the minimum wall thickness required to withstand the design pressure $P_R$ as calculated according to the ASME Boiler and Pressure Vessel code, and the wall design thickness t (mm) calculated according to the relationship $t = P_R \cdot R/(10S - 0.5 P_R) + C + tol$ where R is the internal radius of the reactor tube in mm, S is the design stress intensity at the design temperature in MPa, C is the sum of the inside and outside corrosion allowances for the reactor wall in mm, and tol is the manufacturing tolerance in mm.

Obviously in all aspects of the invention the actual thickness of the reactor wall must be at least as great as the minimum required to withstand both the internal reactor design pressure $P_R$ and also the design pressure of the jacket $P_J$. As has previously been mentioned, a tubular wall can withstand a significantly higher internal pressure than external pressure, which is why it is usually the design pressure of the jacket $P_J$ rather than the reactor $P_R$ which dictates the minimum required thickness of the reactor wall. In a theoretically optimised embodiment of the invention however, the design pressure of the jacket $P_J$ is reduced such that the wall thickness required to withstand $P_J$ is equal to or less than that required to withstand the internal reactor design pressure $P_R$. In this case the minimum reactor wall thickness is instead dictated by $P_R$, and in the most optimised embodiment of the invention the actual thickness of the reactor wall is equal to the minimum wall thickness required to withstand $P_R$. This is of course the lowest wall thickness which can be achieved without changing the internal reaction conditions. However whilst it is possible to employ such an arrangement, it is generally chosen to make the wall slightly thicker than this minimum in order to include a safety margin.

It is also preferred that the design pressure of the jacket $P_J$ is less than $0.0005 \cdot P_R^{2.52}$.

In both aspects of the invention where the cooling fluid is water, the design pressure of the jacket $P_J$ is generally greater than $H/10$ where H is the vertical height of the vertically oriented portion of the jacket in meters, in order to ensure that the jacket can withstand the hydrostatic pressure of the cooling fluid when full. Any case where H is large enough that $H/10$ is greater than the maximum value of $P_J$ required by the present invention is of course outside the scope of this invention, and such a system could only be made viable by increasing the thickness of the reactor wall.

There are a number of ways in which the design pressure of the jacket $P_J$ can be minimised, some or all of which may be applicable in any particular case. Individually, these are all well-known in the art. They include:

Reducing the length of the coolant circuit by optimising its layout.

Simplifying and smoothing the coolant circuit by optimising its layout.

Reducing the pressure drop across control valves and instruments by using improved equipment.

Reducing the pressure drop across the jacket inlets and outlets.

Increasing the diameter of the pipe supplying coolant to the jacket.

Reducing the coolant flowrate (although note that this can also reduce the cooling efficiency by reducing the heat transfer coefficient).

Reducing the pressure drop across the heat exchanger where the coolant is cooled.

Minimising the nitrogen pressure in the coolant surge tank, the margin needed for the control and the overpressure protection.

Minimising the volume of coolant above normal level to limit overpressure due to possible overfill scenario.

Optimising the coolant pump in order to avoid excessive operating pressures.

In another embodiment of the invention, the thickness of the reactor wall is greater at the lowest part of the reactor than at the highest part. Preferably, the wall thickness is greater in the lower quarter of the reactor (by height) than in the upper quarter.

Preferably the reactor wall is constructed of a material having a tensile strength at design temperature of at least 447 MPa, and more preferably above 451 MPa.

A further advantage of the invention is that the increased heat transfer achieved by the reduced reactor wall thickness can be counterbalanced by increasing the diameter of the reactor. Although this reduces heat transfer, it has the benefit that the resultant lower slurry velocity requires lower power consumption. Thus one could have the same heat transfer but at lower overall power consumption.

EXAMPLES

The Examples below relate to 28 inch (712 mm) outer diameter loop reactors having design pressures $P_R$ of 40, 50 or 60 barg, and constructed from a metal having a tensile strength of 451 MPa, equating to an allowable stress intensity of 150.3 MPa at 200° C. (as calculated according to ASME Section IID, Table 2A). To be within the scope of the present invention, the design pressure of the jacket surrounding such a reactor must either be less than $0.0018 \cdot P_R^{2.25}$, or the reactor wall thickness must be either less than 2 mm or less than 10% greater than the minimum thickness required to withstand $P_R$. The minimum reactor wall thicknesses calculated in these Examples allow for manufacturing tolerances of 2.25-3 mm (12.5-17%) depending on the design pressure $P_R$ employed and commercially available pipe thicknesses. A corrosion tolerance of 1 mm inside+1 mm outside was also applied.

All calculations are made using the ASME Boiler and Pressure Vessel code Section VIII, Division 2. Details are summarised in Table 1 below.

In Examples 1 to 4, the design pressure $P_R$ of the reactor is 50 barg, giving a value of $0.0018 \cdot P_R^{2.25}$ of 12.0. The minimum reactor wall thickness required to withstand such a design pressure is 15.98 mm, allowing for manufacturing tolerances and corrosion.

Example 1

Comparative

In this Example the design pressure $P_J$ of the jacket is 13.0 barg. The wall thickness is 19.4 mm, equating to a maximum allowable $P_J$ of 13.3 barg. Thus the reactor wall is 3.4 mm or 21.4% thicker than required by $P_R$. At 13.0 barg, $P_J$ is also greater than $0.0018 \cdot P_R^{2.25}$. Thus this arrangement is outside both aspects of the invention. This shows that the design pressure and wall thickness, although acceptable, have not been optimised according to the invention.

Example 2

This may be regarded as an improvement of Example 1. The jacket design pressure $P_J$ has been reduced from 13.0 barg to 8.8 barg, allowing the reactor wall thickness to be reduced to 17.6 mm (equating to a maximum allowable $P_J$ of 8.9 barg). Thus the wall is just 1.6 mm/10% thicker than required by $P_R$, and $P_J$ is less than $0.0018 \cdot P_R^{2.25}$, meaning that this Example is within the scope of the invention. The benefit of this Example compared with Example 1 is that the reactor wall is only 17.6 mm rather than 19.4 mm thick, resulting in better heat transfer.

Example 3

This is an improvement of Example 2. The jacket design pressure $P_J$ has been reduced from 8.8 barg to 8.0 barg, allowing the reactor wall thickness to be reduced further to 17.2 mm (equating to a maximum allowable $P_J$ of 8.1 barg). Thus the wall is just 1.2 mm/7.6% thicker than required by $P_R$, and $P_J$ is less than $0.0018 \cdot P_R^{2.25}$, meaning that this Example is again within the scope of the invention, and with a thinner wall than Example 2 gives even better heat transfer.

Example 4

This Example is the optimum version of Examples 1-3. The jacket design pressure $P_J$ has been reduced to 5.8 barg, allowing the reactor wall thickness to be reduced to 16.0 mm, the minimum allowable for a $P_R$ of 50 barg. This should be compared with the wall thickness of 19.4 mm in comparative Example 1.

Example 5

This Example is for a reactor having a design pressure $P_R$ of 60 barg, giving a value of $0.0018 \cdot P_R^{2.25}$ of 18.0. The minimum reactor wall thickness required to withstand such a design pressure is 18.68 mm, allowing for manufacturing tolerances and corrosion. In this Example the design pressure of the jacket is 13.0 barg. The wall thickness is 20.6 mm, equating to a maximum allowable $P_J$ of 15.0 barg. Thus the wall is 1.9 mm/10% thicker than required by $P_R$, and $P_J$ is less than $0.0018 \cdot P_R^{2.25}$, meaning that this Example is according to the invention.

Example 6

This Example is an optimised version of Example 5. The jacket design pressure $P_J$ has been reduced to 10.0 barg, allowing the reactor wall thickness to be reduced to 18.7 mm, the minimum allowable for a $P_R$ of 60 barg.

Example 7

This Example is for a reactor having a design pressure $P_R$ of 40 barg, giving a value of $0.0018 \cdot P_R^{2.25}$ of 7.2. The minimum reactor wall thickness required to withstand such a design pressure is 13.45 mm, allowing for manufacturing tolerances and corrosion. In this Example the design pressure of the jacket is 10.0 barg. The wall thickness is 18.0 mm, equating to a maximum allowable $P_J$ of 10.4 barg. Thus the wall is 4.5 mm/33.8% thicker than required by $P_R$, and $P_J$ is more than $0.0018 \cdot P_R^{2.25}$, meaning that this Example is outside the invention.

Example 8

This Example is an improved version of Example 7, according to the invention. The jacket design pressure $P_J$ has been reduced to 5.0 barg, allowing the reactor wall thickness to be reduced to 15.2 mm. Thus the wall is 1.7 mm/13% thicker than required by $P_R$, and $P_J$ is less than $0.0018 \cdot P_R^{2.25}$, meaning that this Example is within the scope of the invention.

TABLE 1

| EXAMPLE: | | 1* | 2 | 3 | 4 | 5 | 6 | 7* | 8 |
|---|---|---|---|---|---|---|---|---|---|
| Outer diameter of reactor | mm | 712 | 712 | 712 | 712 | 712 | 712 | 712 | 712 |
| Design pressure of reactor at bottom-$P_R$ | barg | 50.0 | 50.0 | 50.0 | 50.0 | 60.0 | 60.0 | 40.0 | 40.0 |
| Min. required wall thickness for $P_R$ | mm | 15.98 | 15.98 | 15.98 | 15.98 | 18.68 | 18.68 | 13.45 | 13.45 |
| Actual reactor wall thickness | mm | 19.4 | 17.6 | 17.2 | 16.0 | 20.6 | 18.7 | 18.0 | 15.2 |
| Absolute excess thickness | mm | 3.4 | 1.6 | 1.2 | 0.0 | 1.9 | 0.0 | 4.5 | 1.7 |
| % excess thickness | % | 21.4 | 10.0 | 7.6 | 0.1 | 10.0 | 0.1 | 33.8 | 13.0 |
| Design pressure of cooling jacke-$P_J$ | barg | 13.0 | 8.8 | 8.0 | 5.8 | 13.0 | 10.0 | 10.0 | 5.0 |
| Maximum allowable jacket pressure for selected reactor wall thickness | barg | 13.3 | 8.9 | 8.1 | 6.0 | 15.1 | 10.3 | 10.4 | 5.2 |
| $0.0018 \cdot P_R^{2.25}$ | | | 12.0 | 12.0 | 12.0 | 12.0 | 18.0 | 18.0 | 7.2 | 7.2 |
| $0.0005 \cdot P_R^{2.52}$ | | | 9.6 | 9.6 | 9.6 | 9.6 | 15.1 | 15.1 | 5.4 | 5.4 |

*comparative

The invention claimed is:

1. Tubular reactor for use in polymerisation reactions having a design pressure $P_R$ of 40-65 barg, said reactor comprising a tube having a wall, at least a portion of the tube being oriented vertically and at least part of which vertical portion is surrounded by a concentric jacket for the passage of cooling fluid, wherein the design pressure in barg of the jacket $P_J$ is less than $0.0018 \cdot P_R^{2.25}$.

2. Reactor according to claim 1, wherein the actual thickness of the reactor wall is either no more than 2 mm greater or no more than 10% greater than the wall thickness t (mm) calculated according to the relationship $t=P_R \cdot R/(10S-0.5P_R)+C+tol$ where R is the internal radius of the reactor tube in mm, S is the design stress intensity at the design temperature in MPa, C is the sum of the inside and outside corrosion allowances for the reactor wall in mm, and tol is the manufacturing tolerance in mm.

3. Reactor according to claim 1, wherein the design pressure in barg of the jacket $P_J$ is less than $0.0005 \cdot P_R^{2.52}$.

4. Reactor according to claim 1, wherein the actual thickness of the reactor wall is either no more than 1 mm or no more than 5% greater than the wall design thickness t (mm) calculated according to the relationship $t=P_R \cdot R/(10S-0.5P_R)+C+tol$ where R is the internal radius of the reactor tube in mm, S is the design stress intensity at the design temperature in MPa, C is the sum of the inside and outside corrosion allowances for the reactor wall in mm, and tol is the manufacturing tolerance in mm.

5. Reactor according to claim 1, wherein the design pressure in barg of the jacket $P_J$ is greater than H/10 where H is the vertical height of the vertically oriented portion of the jacket in meters.

6. Reactor according to claim 1, wherein the design pressure of the jacket $P_J$ is such that the wall thickness required to withstand the pressure $P_J$ is equal to or less than the wall thickness required to withstand the internal reactor design pressure $P_R$.

7. Reactor according to claim 1, wherein the thickness of the reactor wall is greater at the lowest part of the reactor than at the highest part.

8. Reactor according to claim 1, wherein the reactor wall is constructed of a material having a tensile strength of at least 447 MPa.

9. Reactor according to claim 8, wherein the reactor wall is constructed of a material having a tensile strength of above 451 MPa.

* * * * *